United States Patent
Odaohhara

(10) Patent No.: US 7,598,701 B2
(45) Date of Patent: Oct. 6, 2009

(54) BATTERY PACK AND METHOD FOR PERMANENTLY DISABLING FUNCTIONS OF A PIRATED BATTERY PACK

(75) Inventor: Shigefumi Odaohhara, Yamato (JP)

(73) Assignee: Lenovo Singapore Pte Ltd., Singapore (SG)

(*) Notice: Subject to any disclaimer, the term of this patent is extended or adjusted under 35 U.S.C. 154(b) by 266 days.

(21) Appl. No.: 11/624,626

(22) Filed: Jan. 18, 2007

(65) Prior Publication Data

US 2007/0194751 A1    Aug. 23, 2007

(30) Foreign Application Priority Data

Jan. 19, 2006    (JP) .............................. 2006-010583

(51) Int. Cl.
*H02J 7/00*    (2006.01)
(52) U.S. Cl. ...................................... 320/106; 320/134
(58) Field of Classification Search ................. 320/106, 320/132, 134, 136, 127, 128, 137, 148, 149, 320/151, 152, 156, 157, 159, 161, 162, 164; 324/433, 426, 609, 713, 158.1; 361/88, 90, 361/92, 93.1; 307/10.7
See application file for complete search history.

(56) References Cited

U.S. PATENT DOCUMENTS 6,404,164 B1* 6/2002 Bean et al. .................. 320/106
2005/0001629 A1* 1/2005 Chen .......................... 324/433
2005/0248309 A1* 11/2005 Denning ..................... 320/106
2006/0028168 A1* 2/2006 Nishida ...................... 320/106
2006/0108982 A1* 5/2006 Daou et al. ................. 320/116
2006/0119316 A1* 6/2006 Sasaki et al. ................ 320/106

FOREIGN PATENT DOCUMENTS

| JP | 08-337032 | 12/1996 |
| JP | 2000-013831 | 1/2000 |
| JP | 2003-173220 | 6/2003 |

* cited by examiner

*Primary Examiner*—Akm E Ullah
*Assistant Examiner*—Ahmed Omar
(74) *Attorney, Agent, or Firm*—Kunzler & McKenzie; Carlos Munoz-Bustamante

(57) ABSTRACT

A battery pack and method are disclosed that permanently disable the battery pack on portable electronic equipment if the battery pack has been inauthentically remanufactured. An output voltage value and a discharge current value of the battery block are measured regularly and an amount of change in the output voltage value per unit time is calculated. If the amount of change in the output voltage value per unit time or the discharge current value exceeds predetermined values, operation of an electric circuit involved in charge/discharge operations of the battery pack is permanently disabled.

15 Claims, 9 Drawing Sheets

(A)

(B1)

(B2)

(C)

BATTERY PACK AND METHOD FOR PERMANENTLY DISABLING FUNCTIONS OF A PIRATED BATTERY PACK

CROSS-REFERENCE TO RELATED APPLICATIONS

This application claims priority of Japanese Patent Application No. 2006-010583, filed Jan. 19, 2006.

BACKGROUND OF THE INVENTION (1) Field of the Invention

The present invention relates to a technique for preventing inauthentic alterations of battery packs for use in portable electronic equipment.

(2) Description of Related Art

The power consumption of portable electronic equipment is rising. For example, the power consumption of notebook personal computers typically rises each year, driven in part by increases in central processing unit (CPU) operating frequency. As used herein, notebook personal computers are referred to as notebook PCs. To accommodate the need for increased power, a demand for reduced battery size and weight, and other needs, notebook PCs have begun using lithium ion batteries and nickel hydrogen batteries with higher energy density in place of conventional nickel-cadmium batteries. At the same time, a battery mechanism called a Smart Battery has become commonly accepted. With the Smart Battery, a battery pack itself contains a microcomputer and controls charging and discharging by exchanging information with the notebook PC itself, to use a battery pack efficiently by strictly managing charge/discharge state. The Smart Battery is battery equipment compliant with the Smart Battery System (SBS) proposed by Intel Corporation of Santa Clara, Calif., and Duracell Inc. of Bethel, Conn. Battery packs that comply with the SBS standard are also referred to as intelligent batteries.

A battery pack that meets SBS intelligent battery requirements consists of an electric circuit portion which in turn consists of a battery block made up of a combination of multiple cells, a CPU, a current measurement circuit, a voltage measurement circuit, various sensors, and the like, all mounted on a substrate. The CPU communicates with an embedded controller in the body of the notebook PC via a communications line and manages charging and discharging between the cells and notebook PC body, making it possible to maintain stable discharging for a long period of time. Also the notebook PC can change power consumption modes according to a cells' remaining capacity or stop operation after presenting a warning on a display if the remaining capacity falls.

Lithium ion batteries are at high risk of ignition, fuming, bursting, performance degradation, and the like in case of overcharge or overdischarge. Thus, the electric circuit of the intelligent battery prevents overcharge by shutting off charge current when cell voltage becomes equal to or higher than a full-charge voltage. The intelligent battery also prevents overdischarge by shutting off discharge current when cell voltage becomes equal to or lower than a discharge inhibit voltage. Also, when an overcurrent occurs, the electric circuit prevents degradation of the cells and breakage of the electric circuit by shutting off current. Once the full-charge voltage, discharge inhibit voltage, or overcurrent conditions are corrected, the intelligent battery can be used normally again.

A battery block is generally made up of a combination of multiple battery cells such as a two-in-parallel and three-in-series combination in order to provide the voltage required for operation of the notebook PC and to extend operating time on the battery pack. When multiple cells are connected in parallel, if two or more cells differ in electric potential are connected in parallel, an intercell current flows. The intercell current depends on a potential difference between the cells and on internal resistance of the cells. Since the internal resistance of the cells is very low, when cells are connected in parallel, even a slight potential difference between the cells will cause a large intercell current to flow into the cell, which in turn may cause burnout of circuit elements or degradation of cells.

Physical properties such as full-charge voltage, discharge inhibit voltage, and potential difference vary greatly with each type of cell. Moreover, cells of the same type and same model vary in physical properties depending on the production lot. Even the cells in the same production lot cannot be connected in parallel unless their conditions are controlled strictly. Thus, combining multiple cells into a battery block must be done carefully by strictly controlling the charge/discharge characteristics of each cell.

The overall life of an intelligent battery pack depends on the life of the battery block. When battery block performance degrades, the performance of the intelligent battery pack degrades. Battery packs whose life has expired such as by exceeding a prescribed charge/discharge count should be collected and recycled, or disposed of after being rendered harmless, by the vendors that have manufactured or sold the battery packs. In particular, the lithium cobalt oxide used for positive poles of lithium ion batteries contains cobalt, which is a rare metal and is toxic to humans. Thus, the batteries must be recycled appropriately.

Because of the expense of replacing a degraded intelligent battery pack, there are dealers who try to reuse intelligent battery packs by replacing only the battery blocks. The act of making alterations to genuine battery packs and reselling the altered battery packs is regarded herein as an inauthentic act. The characteristics of the cells in inauthentically recycled battery blocks are not always matched. In addition, the battery blocks used in battery packs recycled inauthentically sometimes have defects such as small package-wall thickness, insufficient sealing of contents, nonuniform composition of the contents, and large amounts of impurities in the contents. As a result, the inauthentically recycled battery pack may ignite, fume, or burst, causing a fire or damage in the electronic equipment. Thus, the battery blocks in battery packs should be replaced only by authentic manufacturers that possess sufficient manufacturing expertise to insure the safety of the remanufactured battery pack.

BRIEF SUMMARY OF THE INVENTION

From the foregoing discussion, there is a need for a battery pack and method that permanently disables battery pack functions. Beneficially, such a battery back and method would prevent the use of potentially dangerous, inauthentic battery packs.

The present invention has been developed in response to the present state of the art, and in particular, in response to the problems and needs in the art that have not yet been fully solved by currently available battery pack function disabling methods. Accordingly, the present invention has been developed to provide a battery pack and method for permanently disabling battery pack functions that overcome many or all of the above-discussed shortcomings in the art.

The battery pack to permanently disable battery pack functions is provided with a battery block, a charge/discharge circuit, and a processor. The battery block contains at least one cell. The charge/discharge circuit provides a charge/discharge path for the battery block. The processor permanently disables functions of the charge/discharge circuit if an amount of change in voltage of the battery block per unit time exceeds a predetermined value. By permanently disabling functions of the charge/discharge circuit, the battery pack may prevent the use of inauthentic battery packs.

A method of the present invention is also presented for disabling functions of a battery pack. The method in the disclosed embodiments substantially includes the steps to carry out the functions presented above with respect to the operation of the described battery pack. In one embodiment, the method includes monitoring a voltage value and permanently disabling the functions of the battery pack.

A processor monitors a voltage value of a battery block on a regular cycle. The processor permanently disables functions of a battery pack if an amount of change in voltage of the battery block exceeds a predetermined value. The method permanently disables the battery pack to prevent the potentially dangerous use of inauthentic battery packs.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of present invention permanently disables a batter pack so the battery pack is difficult to recycle. Furthermore, the present invention provides a method for disabling charge/discharge functions to prevent the use of inauthentic battery packs. These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
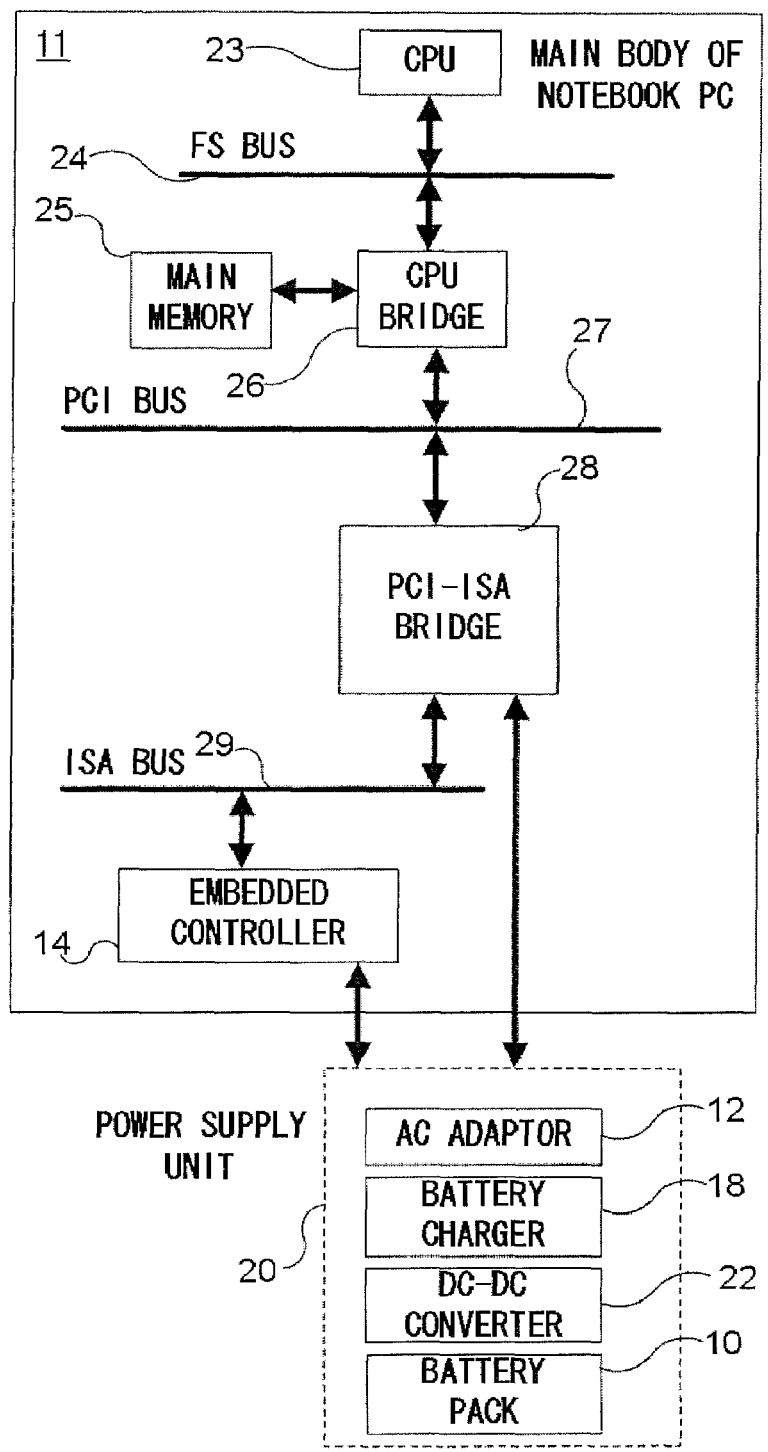
FIG. 1 is a schematic block diagram showing a power supply unit and related components in a notebook PC to which an embodiment of the present invention is applied.

An embodiment of the present invention will be described in detail below with reference to the drawings. FIG. 1 is a block diagram showing a power supply unit and related components in a notebook PC 11 to which this embodiment is applied. The power supply unit 20 of the notebook PC 11 consists of a battery pack 10, AC adaptor 12, battery charger 18, and DC-DC converter 22, etc. The battery pack 10 is an intelligent battery compliant with the SBS standard. It is configured to be attachable/detachable to/from the notebook PC 11. The battery pack 10 may be available on the market separately as a replacement part or spare part. The AC adaptor 12 is a power supply unit connected to a commercial power supply (not shown). The battery charger 18 charges the battery pack 10 with DC power supplied from the AC adaptor 12. The power from the AC adaptor 12 and battery pack 10 is supplied to various parts of the notebook PC via the DC-DC converter 22.

The notebook PC 11 is equipped with an embedded controller 14 connected to an ISA bus 29. The embedded controller 14 has a power supply management function of the notebook PC 11 and controls the power supply unit 20. Also, it is capable of communicating with a CPU 23, main memory 25 and other hardware components of the notebook PC 11, being interconnected with them via the ISA bus 29, a PCI-ISA bridge 28, a PCI bus 27, a CPU bridge 26, an FS bus 24, and the like. For simplicity, additional hardware components of the notebook PC 11 such as a display, magnetic disk, optical disk, and keyboard are omitted in FIG. 1.

Figure 2:
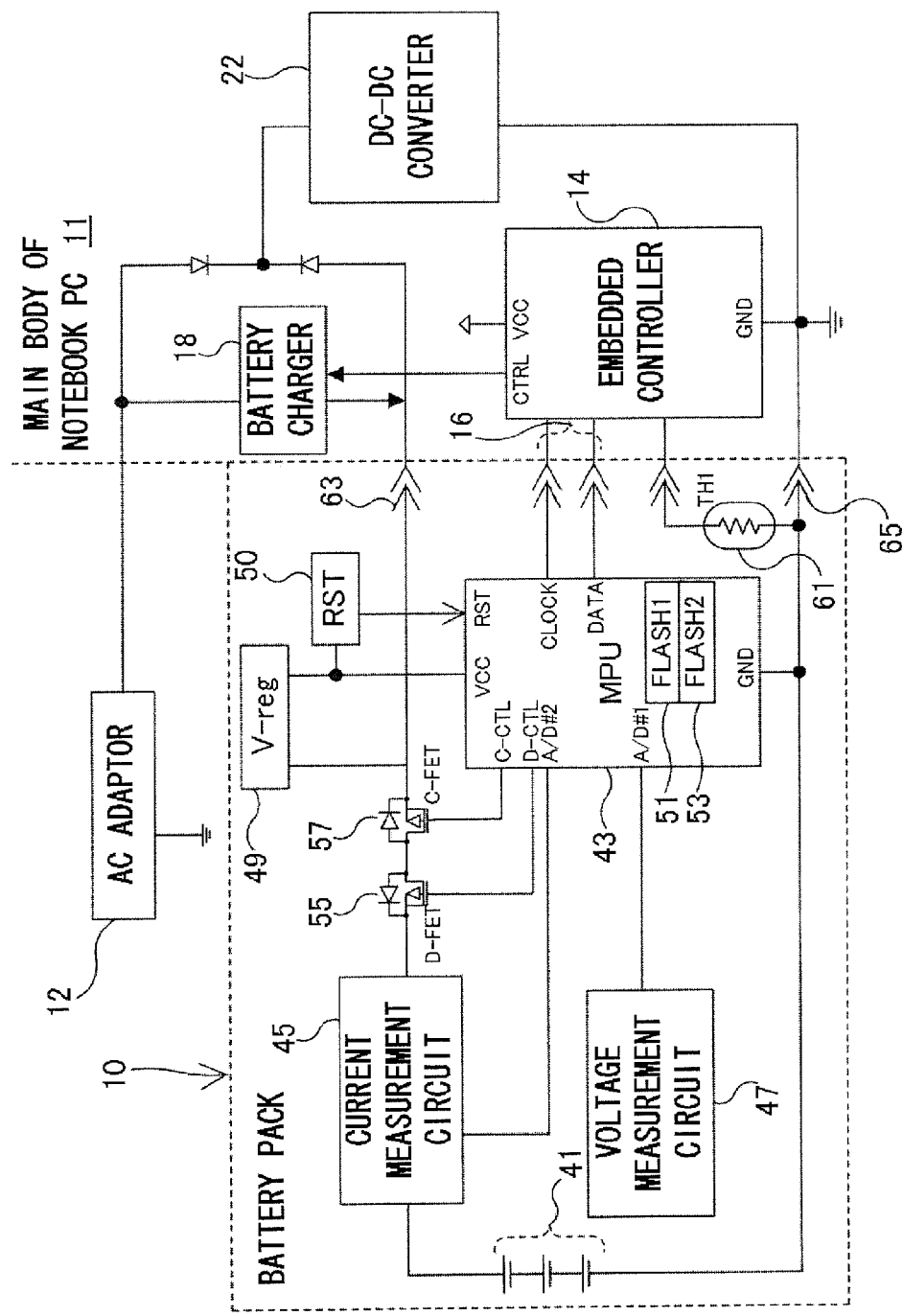
FIG. 2 is a schematic block diagram showing a configuration of the battery pack with its surroundings to which an embodiment of the present invention is applied.
Figure 3:
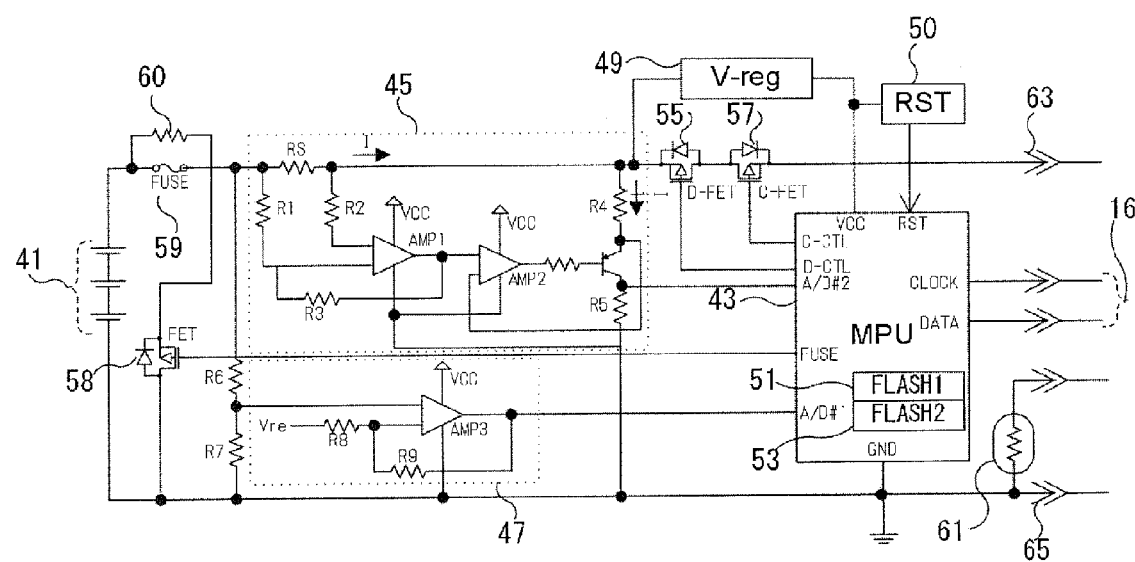
FIG. 3 is a schematic block diagram showing a circuit configuration in the battery pack according to an embodiment of the present invention in more detail.

FIG. 2 is a schematic block diagram showing a configuration of the battery pack 10 of FIG. 1 with the battery pack's surroundings. FIG. 3 is a schematic block diagram showing a circuit configuration in the battery pack 10 in more detail. The battery pack 10 is equipped with a battery block 41 composed of multiple unit cells, a MPU 43, a current measurement circuit 45, a voltage measurement circuit 47, a voltage regulator 49, etc.

The MPU 43 may control the battery pack 10 and communicate with the embedded controller 14 via communications lines 16. In one embodiment, the communication lines 16 comprise CLOCK and DATA lines. The current measurement circuit 45 may measure charge and discharge current values.

The charge and discharge current values may measure the current charged to and discharged from the battery pack 10. In one embodiment, the voltage measurement circuit 47 measures output voltage values of the battery block 41.

For example, the battery block 41 may be a six-cell lithium ion battery set with a two-in-parallel, three-in-series configuration (1.8 Ah/cell). Hereinafter, the electric circuit in the battery pack 10 excluding the battery block 41 will be referred to collectively as an electric circuit portion.

The MPU 43 in the battery pack 10 has a CPU that processes data in words of 8 to 16 bits, as well as a RAM, two flash memories 51 and 53 which are non-volatile memories, an analog I/O, a timer, a digital I/O, and the like in a single package. The MPU 43 can execute a control program for the battery pack 10 loaded from the first flash memory 51. Integrating the CPU and flash memories 51 and 53 into a single package makes it difficult to refer to, change, or erase contents of the flash memories 51 and 53 from outside the MPU.

Analog signals representing measurement results are communicated from the current measurement circuit 45 and voltage measurement circuit 47 to the MPU 43, and processed in the MPU 43 after A/D (analog to digital) conversion. Consequently, the MPU 43 obtains battery management information including battery capacity and charge/discharge counts. The battery information thus obtained is transmitted to the embedded controller 14 in the system via a communications line 16, i.e., a communication channel, using an SBS protocol.

In the current measurement circuit 45 as shown in FIG. 3, a discharge current I flowing from the battery block 41 causes a potential difference or a voltage of I×RS to develop across a resistor (RS). An operational amplifier (AMP1) differentially amplifies the voltage. Also, an operational amplifier (AMP2) and transistor cause a current I1 proportional to output a voltage value of the operational amplifier (AMP1) that flows through a resistor (R4). Eventually, the value of the discharge current I of the cells 41 can be transformed to a voltage of I1×R5 which is generated in a resistor (R5). The voltage (I×R5) is communicated to a #2 A/D port of the MPU 43.

Turning to the voltage measurement circuit 47 as shown in FIG. 3, an output voltage value of the battery block 41 is transformed to a lower voltage, differentially amplified and converted by an operational amplifier (AMP3), and communicated to a #1 A/D port of the MPU 43. By converting these output voltage values from analog to digital, the MPU 43 can measure the present discharge current and voltage of the battery block 41. The measured present discharge current and voltage are stored in the second flash memory 53 in the MPU 43 at predetermined intervals. In one embodiment, the discharge current and voltage are recorded at intervals of 1,000 milliseconds.

The MPU 43 has a DATA terminal for use to communicate with the embedded controller 14 via the communications line 16 as well as output ports C-CTL, D-CTL, and FUSE that control field effect transistors (FET) 55, 57, and 58. D-FET 55 controls discharging of the battery block 41. C-FET 57 controls charging. When an FET 58 is turned on, a current flows through a heating wire 60 near a fuse 59, blowing the fuse 59. D-FET 55, C-FET 57, and the fuse 59 comprise a charge/discharge circuit of the battery pack 10.

The output voltage values of the battery block 41 are outputted to the DC-DC converter 22 via a positive output terminal 63 and negative output terminal 65. When the voltage of the battery block 41 is within a predetermined range, the voltage regulator 49 supplies a fixed voltage to a power supply terminal Vcc of the MPU 43. If the output voltage of the battery block 41 falls and the voltage regulator 49 cannot supply the fixed voltage to the power supply terminal Vcc of the MPU 43, a hardware reset circuit 50 detects the fall in voltage and communicates a hardware reset signal to the MPU 43. In one embodiment, a thermistor 61 is placed near the battery block 41 and outputs a voltage generated in it to the embedded controller 14.

The present invention is described for use with a typical configuration an intelligent battery pack 10 compliant with the SBS standard. One of skill in the art will recognize that the present invention may be practiced with other battery pack configurations. The function disablement according to the present invention can be provided as a battery pack control program may be stored in the first flash memory 51 and executed by the MPU 43, reducing the cost of implementing the present invention for the battery pack 10.

For simplicity, FIGS. 2 and 3 show only major hardware components and their connections to illustrate this embodiment. For example, when the battery block 41 is composed of multiple cells connected in series, the voltage measurement circuit 47 may measures the voltages of the individual battery cells. Besides, the battery pack 10 and its surrounding circuits are made up of many other electric circuits and devices, which are not described in detail herein because they are known to those skilled in the art. The multiple blocks illustrated in FIGS. 2 and 3 may be combined together into an integrated circuit or conversely divide a single block into multiple integrated circuits as is well known to those of skill in the art, and such modifications are included in the scope of the present invention.

Figure 4:
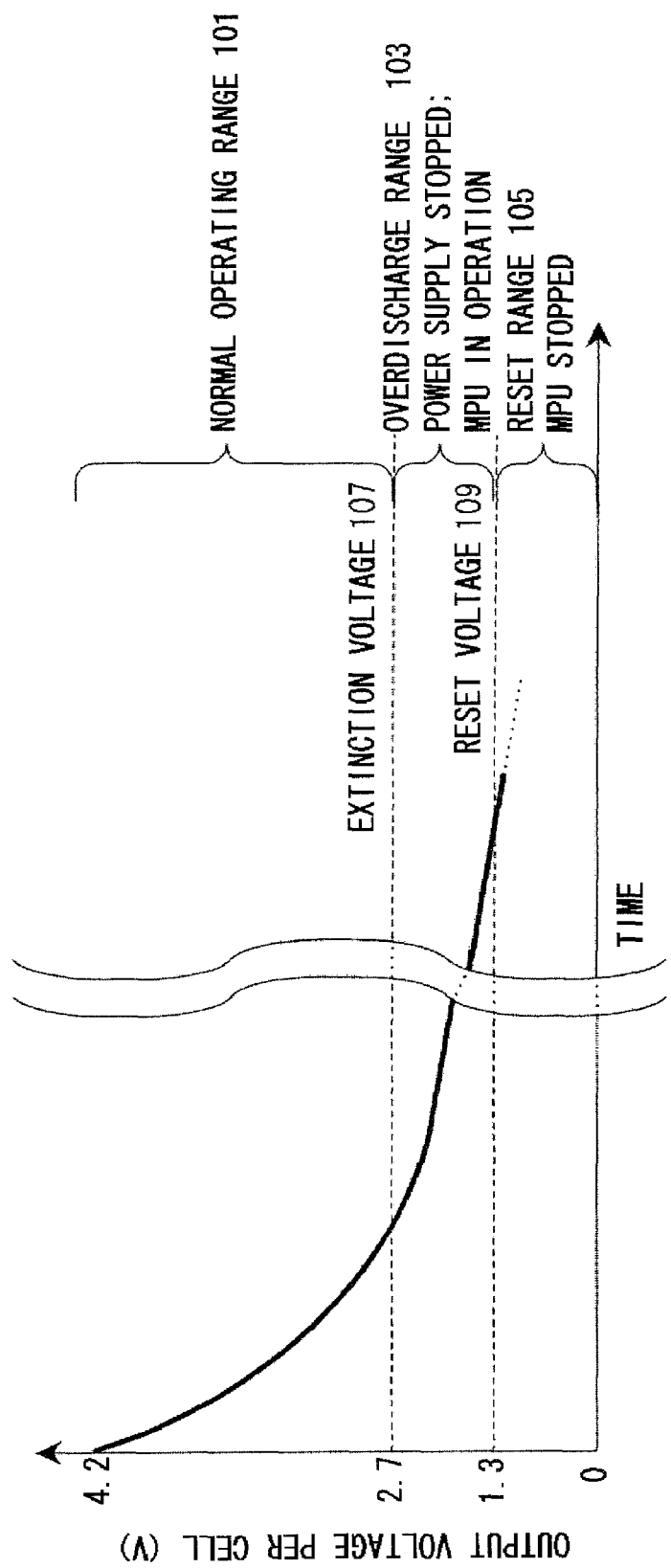
FIG. 4 is a diagram showing time variations of voltage outputted per cell during discharging by a battery block.

FIG. 4 is a diagram showing time variations of voltage output per cell during discharging by the battery block 41 mounted on the notebook PC 11. In the case of a battery block 41 constituted of lithium ion batteries, voltage values for a normal operating range 101 are 2.7 to 4.2 V per cell. Deviation in the voltage of battery block 41 from the normal operating range 101 can cause substantial performance degradation of the battery block 41 and accidents such as ignition. As shown in FIG. 4, the battery block 41, which has been charged to around 4.2 V, starts discharging to supply power to the main body of the notebook PC. As the discharging continues, the output voltage of the battery block 41 falls gradually. If the value of the output voltage falls below the value of the extinction voltage set at 2.7 V, D-FET 55 turns off to stop power supply from the battery block 41 to the main body of the notebook PC 11. Even if the power supply to the main body of the notebook PC 11 is stopped, the electric circuit portion of the battery pack 10 including the MPU 43 remains in operation by being supplied with power from the battery block 41. As the battery block 41 continues discharging further and the output voltage falls below the value of the reset voltage set at 1.3 V, the MPU 43 is reset and the electric circuit portion of the battery pack 10 stops operating. Hereinafter, the range of the output voltage not lower than the extinction voltage such as the exemplary 2.7 V and not higher than a charged voltage such as the exemplary 4.2 V will be referred to as the normal operating range 101. In addition, the range not lower than the reset voltage such as the exemplary 1.3 V and not higher than the extinction voltage such as the exemplary 2.7 V will be referred to as an overdischarge range 103, and the range not higher than the reset voltage such as the exemplary 1.3 V will be referred to as a reset range 105.

FIG. 4 shows how the cell voltage falls with time. The trend of voltage reduction in the normal operating range 101 depends on usage of the notebook PC 11. In the overdischarge range 103, voltage reduction is caused by spontaneous discharge and slight power used to operate the MPU, voltage measurement circuit, and the like, and thus the amount of voltage reduction per unit time is very small and the time required for transition from the extinction voltage value to the reset voltage value is around two years at the shortest. In the reset range 105, the voltage falls only due to spontaneous discharge, and thus the amount of voltage reduction per unit time is even smaller.

Figure 5:
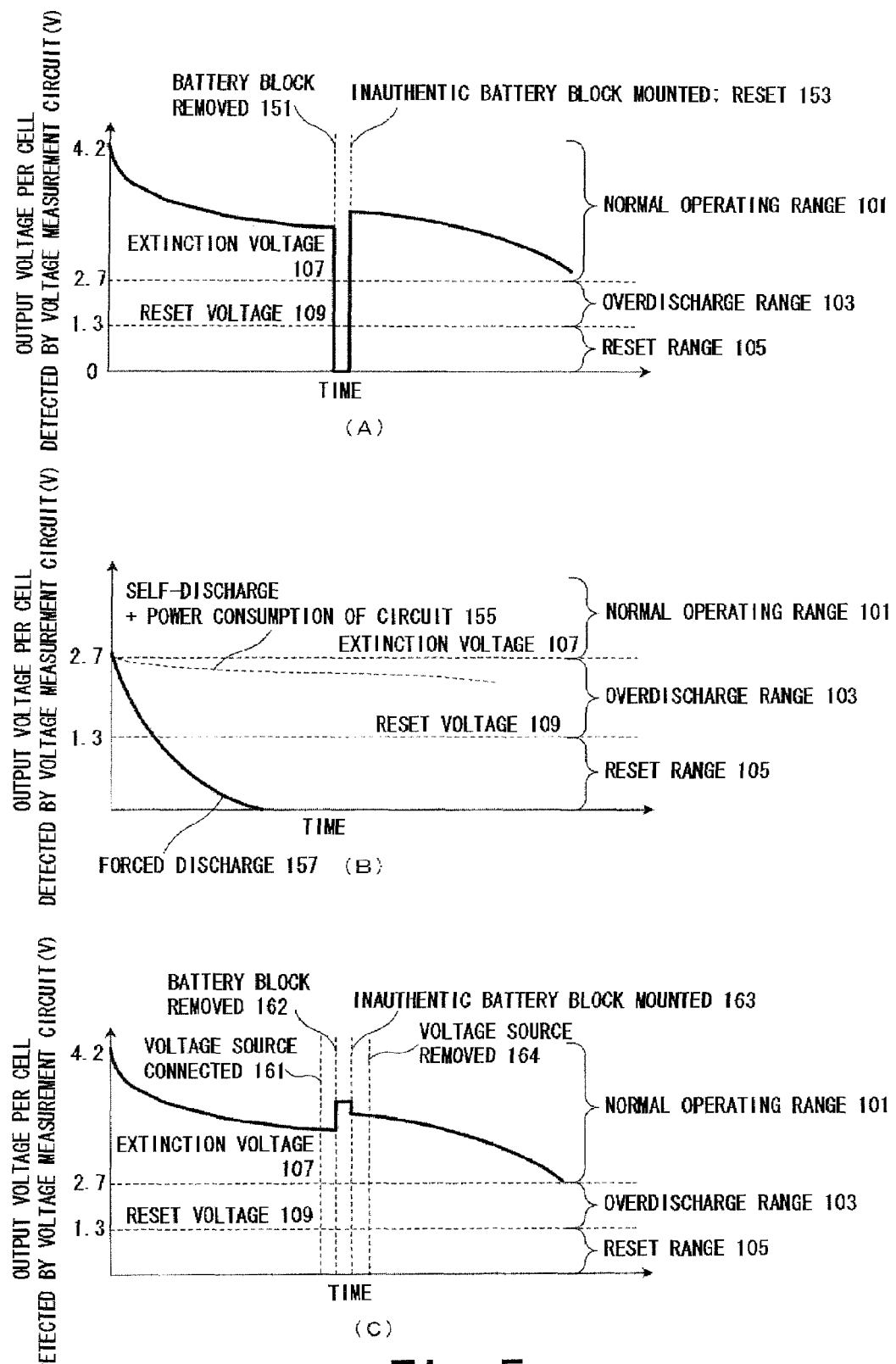
FIG. 5 is a diagram showing voltage variations in the case of an inauthentic cell replacement as measured by a voltage measurement circuit.
Figure 6:
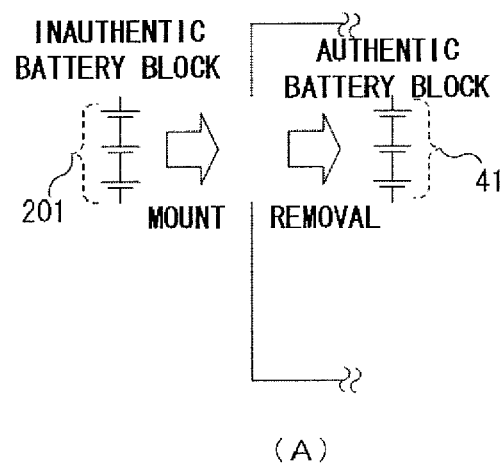
FIG. 6 is a diagram showing what goes on around the battery block in the case of an inauthentic battery block replacement.
Figure 6:
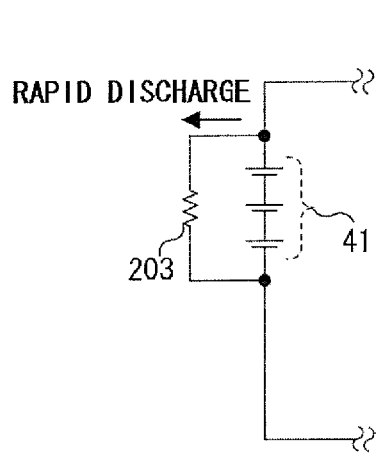
Figure 6:
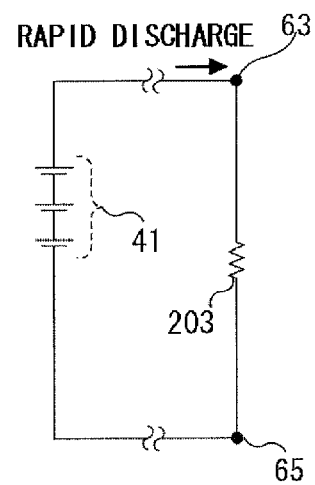
Figure 6:
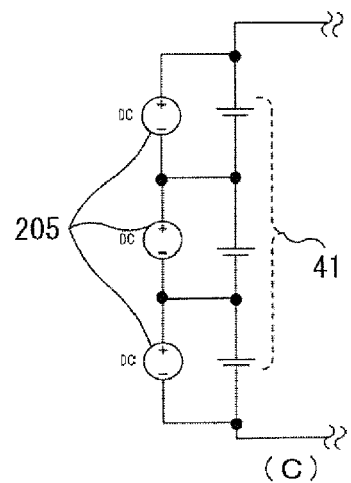

FIG. 5 is a diagram showing voltage variations in the case of an inauthentic cell replacement as measured by the voltage measurement circuit 47, which measures the output voltage of the battery block 41. FIG. 6 is a diagram showing the battery block 41 in the case of an inauthentic battery block replacement. FIG. 6 shows only the battery block 41, output terminals 63 and 65, and their surroundings extracted from the internal circuit diagram of the battery pack 10 shown in FIGS. 2 and 3. For example, an outer casing of the battery pack 10 may be opened and the battery block 41 removed from the electric circuit portion and replaced by inauthentic cells 201 as shown in FIG. 6A when the value of voltage measured by the voltage measurement circuit 47 is equal to or higher than the reset voltage value. When the cells 41 are removed, the voltage value becomes zero as shown in 151 in FIG. 5A, and the MPU 43 stops operating. Subsequently, when the inauthentic battery block 201 is mounted and the voltage value rises again as shown in 153 in FIG. 5A, the MPU 43 resumes operation after being reset and restarted.

The voltage value measured by the voltage measurement circuit 47 always passes through the overdischarge range 103 before it reaches the reset voltage value. In the overdischarge range 103, in which only spontaneous discharge and discharge attributable to uniform power consumption of the MPU 43 and other circuits take place, the amount of voltage change dV/dt per unit time remains small and constant. According to this embodiment, when the voltage value reaches the reset voltage 109 through such an amount of voltage change dV/dt, it is considered that the reset voltage 109 has been reached normally and a reset flag is set in the flash memory 53, indicating Normal state. On the other hand, if the reset voltage 109 is reached through a large amount of voltage change dV/dt as shown in FIG. 5A, the reset flag is not set in the flash memory 53, which indicates inauthentic state.

The control program is configured such that the MPU 43 always refers to the reset flag in the flash memory 53 when performing a reset operation. If a voltage change dV/dt as shown in FIG. 5A occurs as a result of an inauthentic replacement of the battery block 41, the MPU 43 does not detect a reset flag on the flash memory 53 when performing a reset operation, and thus it recognizes the removal and inauthentic replacement of the battery block 41 (condition A).

A dealer may connect another load 203 across the battery block 41 as shown in FIG. 6B1 and lower the battery block voltage to the reset voltage by forced discharge to prevent the battery block replacement from being detected based on condition A. Also, the dealer may connect the load 203 between the output terminals 63 and 65 of the battery pack 10 to forcedly discharge the battery block 41 similarly as shown in FIG. 6B2. In that case, when the output voltage value of the battery block 41 falls below the reset voltage value, a reset flag indicating a Normal state is set in the same way as under condition A, making it possible to reset the MPU 43 normally. Consequently, even if the battery block is removed and replaced with the inauthentic battery block 201 in the same manner as in FIG. 6A, the inauthentic battery block replacement cannot be detected using condition A.

In this case, however, the amount of downward voltage change dV/dt per unit time measured by the voltage measurement circuit 47 in the overdischarge range 103 is sharper than in the case of the spontaneous discharge and the discharge attributable to power consumption of the circuits as shown in FIG. 5B. In the overdischarge range, the value of current is on the order of 5 μA when the spontaneous discharge of the cells and power consumption of the circuits are added. The capacity of a battery block 41 may be 80 mAh as an example. Thus, dV/dt per cell in the overdischarge range 103 from the extinction voltage 2.7 V to the reset voltage 1.3 V is on the order of (2.7 V−1.3 V)×(5 μA/80 mAh)=87.5 μV/hour. This is a gentle voltage reduction as shown by a curve 155 in FIG. 5B. In one example, a forced discharge from the extinction voltage 2.7 V to the reset voltage 1.3 V may take 16 hours. The reduction in the output voltage may be (2.7 V−1.3 V)/16 h=87.5 mV/hour. This is a sharp voltage reduction as shown by a curve 157 of FIG. 5B. In this way, the difference in the value of dV/dt between when a forced discharge is used and when no forced discharge is used is significant, such as on the order of 1000 times. Thus, when the MPU 43 calculates the amount of voltage change dV/dt based on the output voltage value of a battery block measured by the voltage measurement circuit 47 and finds the amount, for example, to be 100 μV/hour per cell or above, the MPU 43 may determine that there has been a forced discharge intended for an inauthentic battery block replacement (condition B1).

When the voltage value measured by the voltage measurement circuit 47 is in the overdischarge range 103, if a forced discharge is effected by connecting a load 203 between the output terminals 63 and 65 of the battery pack 10 as shown in FIG. 6B2, with the battery pack shown in FIGS. 2 and 3, an overdischarge-voltage protection function comes into action, turning off D-FET 55 and thereby stopping the voltage output. In one embodiment, there is no D-FET and thus the voltage output cannot be stopped even in an overdischarge voltage condition. In this case, by measuring the discharge voltage with the current measurement circuit 45 in addition to detection based on condition B1, it is possible to detect the presence or absence of a forced discharge based on variations in discharge current values, and thereby detect any discharge different from those occurring under normal usage. In the overdischarge range 103, no power is supplied to outside the battery pack 10 and power from the battery block 41 is consumed only within the battery pack 10. Moreover, the electric circuit portion may consume as little as 3 μA of power, and the discharge current value is as low as 5 μA even if self-discharge of the cells is added. On the other hand, in order for discharging to take place from the extinction voltage 2.7 V to the reset voltage 1.3 V in 16 hours using a battery block with a capacity of 80 mAh, the discharge current value should be 80 mAh/16 h=5 mA. In this way, the difference in the discharge current value between when a forced discharge is used and when no forced discharge is used is on the order of 1000 times. Thus, if the discharge current value is, for example, 10 μA or above when the voltage value is in the overdischarge range 103, it can be considered that there has been a forced discharge intended for an inauthentic cell replacement (condition B2).

Detecting condition B2 allows forced discharges to be detected with a higher accuracy than condition B1. However, when the voltage value measured by the voltage measurement circuit 47 is in the normal operating range and power is supplied to the notebook PC 11, the discharge voltage outputted from the battery pack 10 varies greatly with changes in operating conditions of the notebook PC (e.g., CPU load, display brightness, whether or not a magnetic disk or optical disk is used, etc.), so it is difficult to distinguish between a discharge current during normal use and discharge current due to a forced discharge. Thus, condition B2 is used only when the voltage value is in the overdischarge range 103.

Since the power from the battery block 41 may be consumed only within the battery pack 10 while the output voltage value of the battery block 41 is in the overdischarge range 103, with a battery pack 41 in which, for example, the self-discharge of the cells and power consumption of the circuits are on the order of 5 μA in total and the capacity of the battery block is 80 mAh, it takes 80 mAh/(5 μA×24 hours×30 days)=approximately 22 months or more for the output voltage per cell to fall from the extinction voltage 2.7 V to the reset voltage 1.3 V. Thus, it is very unlikely that a battery pack recycling business will be feasible even if the battery pack 10 is made to discharge almost as gently as during spontaneous discharging in an attempt to avoid detection of forced discharges based on conditions B1 and B2.

A dealer may replace the battery block 41 with an inauthentic battery block 201 by connecting another voltage source 205 across each cell in the battery block 41 as shown in FIG. 6C when the output voltage of the battery block 41 is in the normal operating range 101 so that there will not be voltage reduction when the battery block 41 is removed, and thereby prevents a reset operation from being performed by the MPU 43 when the voltage detected by the voltage measurement circuit 47 becomes zero. In that case, there are four operational steps as shown in FIG. 5C: connection 161 of the voltage source 205, removal 162 of the battery block 41, installation 163 of the inauthentic battery block 201, and removal 164 of the voltage source 205. In the removal 162 of the battery block 41 and installation 163 of the inauthentic battery block 201, in particular, there can be such voltage variations in a short time that are unlikely under normal usage. Moreover, the voltage measured by the voltage measurement circuit 47 does not fall below the reset voltage value in the first place, so the MPU 43 is never reset. Thus, condition A is not capable of detecting an inauthentic operation. Also, the detection of inauthentic operations based on conditions B1 and B2 is limited to cases in which the output voltage of the battery block 41 is in the overdischarge range 103. These conditions are not used for detection in the normal operating range 101.

However, even when the output voltage of the battery block 41 is in the normal operating range 101, voltage variations in a short time such as shown in 161 to 164 in FIG. 5C can be determined, in particular, based on variations in the output voltage of each cell. The voltage output from the battery block 41 in the battery pack 10 has relatively small variations in its value when it is in the normal operating range 101 regardless of the operating conditions of the notebook PC 11. The operation shown in FIG. 5C should be performed on a cell by cell basis, but all the cells must output a uniform voltage to avoid adverse effects of intercell currents on the cells and circuit elements as described above. This provides a condition for detecting whether another voltage source has been connected or whether a battery block has been replaced. For example, if the output voltage of a specific cell changes or the difference in output voltage between cells becomes equal to or larger than 50 mV in the normal operating range 101, it can be considered that the battery block 41 has been removed and replaced (condition C). It is practically difficult to replace cells with inauthentic ones by connecting a voltage source while managing the voltages of all the cells strictly in this way.

Figure 7:
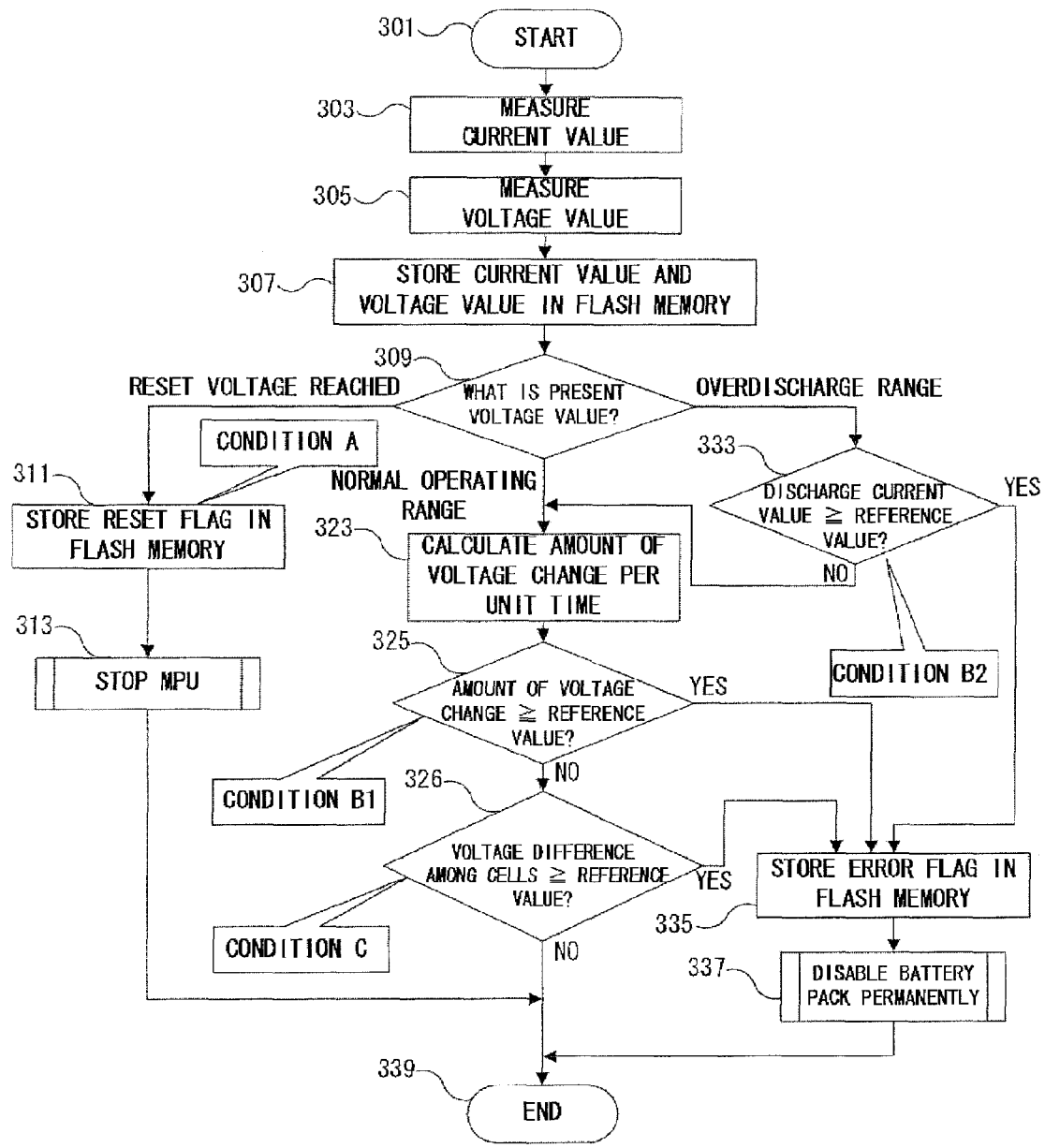
FIG. 7 is a flowchart showing a process started on a regular cycle while an MPU is in operation according to an embodiment of the present invention.
Figure 8:
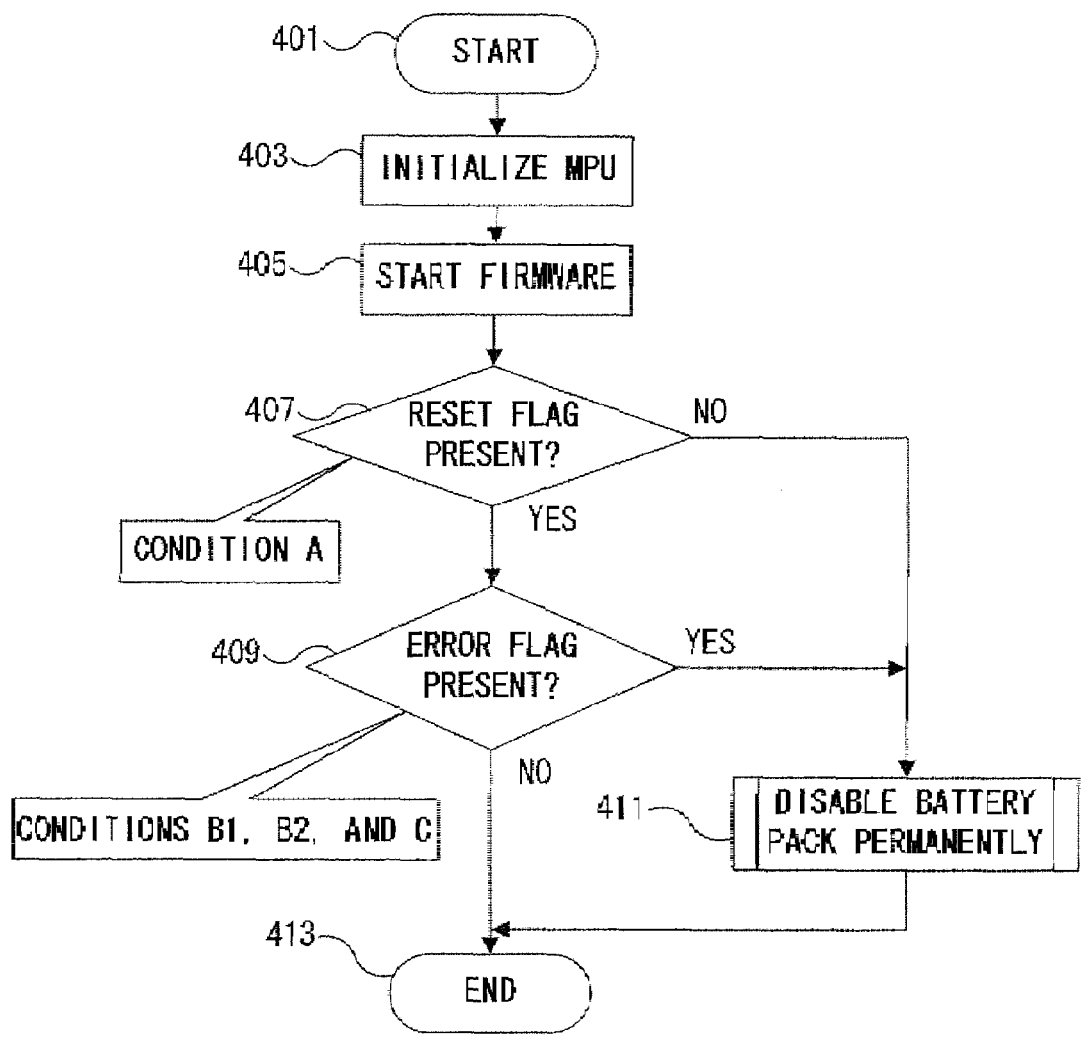
FIG. 8 is a flowchart showing a process performed when the battery pack is started according to an embodiment of the present invention.

FIGS. 7 and 8 are flowcharts showing the processes of detecting an inauthentic battery block replacement based on the conditions described above. The process in FIG. 7 is performed on a regular cycle such as every 1,000 ms when the output voltage of the battery block 41 in the battery pack 10 is equal to or higher than the reset voltage value and the MPU 43 is in operation (Step 301). The MPU 43 receives analog signals from the current measurement circuit 45 and the voltage measurement circuit 47 via analog terminals, converts the signals from analog to digital, measures the voltage value and discharge current value output from the battery block 41, and stores measurement results in the second flash memory 53 (Steps 303 to 307). Then, the MPU 43 determines the present voltage value of the battery block 41 (Step 309).

If the present voltage value of the battery block 41 reaches the reset range 105, the MPU 43 stores a reset flag which indicates that the battery pack 10 has been reset successfully in the second flash memory 53 (Step 311), stops the MPU's 43 own operation (Step 313), and the method terminates (Step 339). Subsequently, the MPU 43 does not resume its operation until the voltage value recovers to the reset range 105 or above.

If the present voltage value of the battery block 41 is in the normal operating range 101, the MPU 43 calculates the amount of voltage change dV/dt per unit time from the present voltage value and a voltage value for a previous cycle (Step 323). In so doing, for a more accurate determination, the MPU 43 may determine the amount of voltage change dV/dt using a moving average calculated from the present voltage value and voltage values for the previous few cycles. The MPU 43 determines the amount of voltage change dV/dt (Step 325: condition B1) and determines the difference in output voltage among the cells (Step 326: condition C). If either of them are equal to or higher than a reference value, the MPU 43 stores an error flag in the second flash memory 53 (Step 335), indicating that there has been an abnormal event such as a connection of another voltage source, forced discharge, or inauthentic battery block replacement based on conditions B1 and C, and permanently disables the charge/discharge circuit of the battery pack 10 (Step 337). If the amount of voltage change dV/dt and difference in output voltage are smaller than the reference values, the MPU 43 ends the method (Step 339). The process of permanently disabling the battery pack 10 (step 337) will be described in more detail later.

When the present voltage value of the battery block 41 reaches the overdischarge range 103, the MPU 43 determines the present discharge current value (Step 333). If the discharge current value is equal to or higher than a reference value, the MPU 43 stores an error flag in the second flash memory 53 (Step 335), and permanently disables the charge/discharge circuit of the battery pack 10 (Step 337), as in the case of the processing in the normal operating range 101 based on the condition B2. If the discharge current value is equal to or lower than the reference value, the MPU 43 goes to the processes of determining the amount of voltage change dV/dt per unit time and the difference in output voltage among the cells (Step 323 and later), as in the case of the processing in the normal operating range.

The processes in FIG. 8 are performed when the MPU 43 is restarted after a reset (Step 401). After initialization of the MPU 43 (Step 403), the control program for the battery pack 10 is read out of the first flash memory 51 and executed by the MPU 43 (Step 405). First, the MPU 43 reads contents of the second flash memory 53 and checks for a reset flag and error flag in the flash memory (Steps 407 and 409). If there is no reset flag, the MPU 43 determines, based on condition A, that there has been an inauthentic removal of the battery block 41. If an error flag is set, the MPU 43 determines, based on condition B1, B2, or C, that there has been an abnormal event such as a connection of another voltage source, forced discharge, or inauthentic battery block replacement. That is, inauthentic state is set in the flash memory by means of the reset flag and error flag. If inauthentic state is set, the MPU 43 permanently disables the battery pack 10 (Step 411). Otherwise, the method ends the battery pack 10 may be used normally (Step 413).

The MPU 43 may be reset without storing an error flag (step 335). Instead, when the MPU 43 is restarted in FIG. 8, the MPU 43 reads the past voltage values and discharge current values stored up to the time just before the reset out of the second flash memory 53, calculates the amount of voltage change dV/dt per unit time, and checks for inauthentic state based on each of the conditions A, B1, B2, and C. The battery pack 10 may be permanently disabled when an inauthentic state is detected.

If an abnormal event considered to be attributable to an inauthentic battery block replacement is found in the process described above, the battery pack 10 is permanently disabled. The permanent disablement is the act of making battery pack nonreusable unless parts or the control program of the MPU 43 is replaced by opening the outer casing of the battery pack 10. More specifically, possible methods include one which stops discharging the battery block 41 by turning off D-FET 55, one which stops charging the battery block 41 by turning off C-FET 57, and one which blows the fuse 59 by turning on the FET 58. However, it is easy to conceive that even after the FETs 55 and 57 are turned off and the fuse 59 is blown out, the flow of current to the output terminals 63 and 65 can be restored from the battery block 41 by electrically shorting the FETs and the fuse location.

Figure 9:
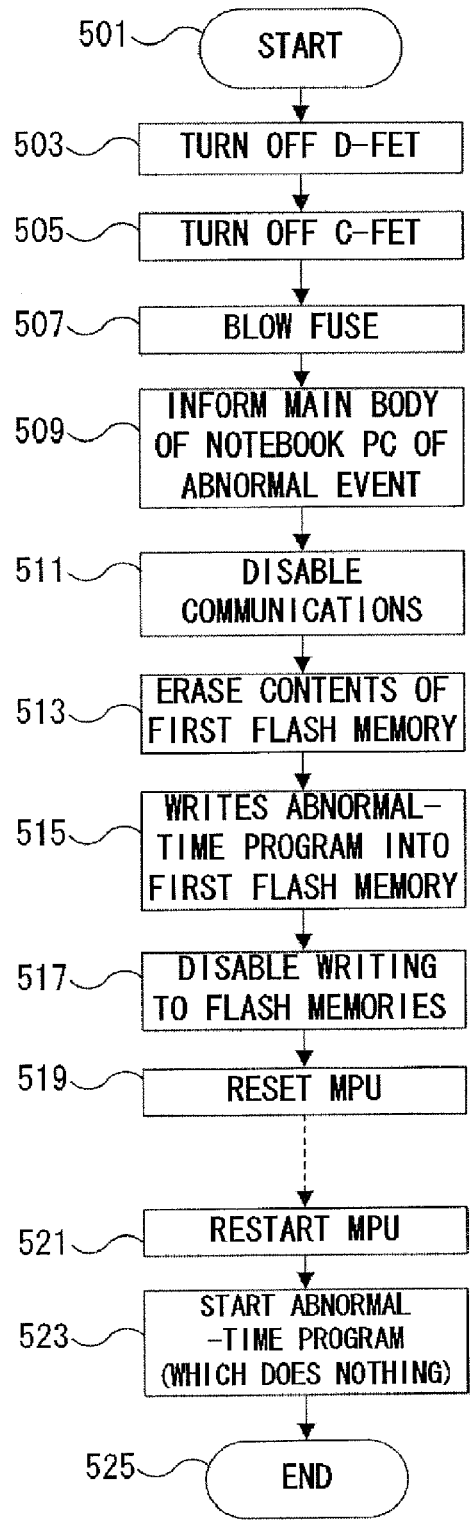
FIG. 9 is a flowchart showing the process of permanently disabling the battery pack according to an embodiment of the present invention.

Thus, the process of permanently disabling the battery pack (step 337) may include permanently disabling the functions of the MPU 43 by rewriting the battery pack's (10) control program held in the first flash memory 51. FIG. 9 is a flowchart showing the process of permanently disabling the battery pack 10. If the MPU 43 determines the battery pack 10 should be disabled, the disabling process is started (Step 501). The MPU 43 may turn off D-FET 55 and C-FET 57 (Steps 503 to 505), and then turns on the FET 58 to blow the fuse 59 (Step 507). The MPU 43 may inform the notebook PC 11 about the occurrence of the abnormal event via the communications line 16 (Step 509), and then disables communications via the communications line 16 (Step 511). Furthermore, the MPU 43 erases the contents of the first flash memory 51 (Step 513), writes an abnormal-time program (Step 515), and disables writing to the first and second flash memories 51 and 53 (Step 517).

When the MPU 43 resets itself under this condition (Step 519), only the abnormal-time program, which does nothing to control the battery pack 10, runs on the restarted MPU 43 (Steps 521 to 523). Since the MPU 43 consists of a processor and flash memories formed in a single integrated circuit and the flash memories are already write-disabled, it is practically impossible to read and write the first and second flash memories 51 and 53 from outside. Thus, the MPU 43 finishes processing, practically disabling itself (Step 525). No matter how many times the MPU 43 may be reset, there is no change to the disabled state.

Of course, when the battery pack 10 with the disabled MPU 43 is mounted on the notebook PC 11, there is no response from the MPU 43 to communications conducted by the embedded controller 14 via the communications line 16, and thus the notebook PC 11 does not recognize the battery pack 10 that has been mounted. At this time, even if the output terminals 63 and 65 are ready to output power, the notebook PC 11 cannot use the battery pack as a power source. That is, by disabling the MPU 43, it is possible to disable the electric circuit portion of the battery pack 10. This prevents attempts to replace a battery block 41 by cutting it off from the electric circuit portion, and thereby provide an inauthentic battery pack 10.

An embodiment of the present invention has been described with reference to the drawings, but the present invention is not limited to the embodiment described above. Needless to say, any known configuration may be used as long as the effects of the present invention can be attained.

The present invention is applicable not only to notebook PCs 11, but also to electronic equipment in general that use intelligent batteries as a power source. Also, the present invention is applicable to electronic equipment in general use a battery pack not compliant with the SBS standard, provided that the battery pack contains a processor and manages charging and discharging by communicating with the main body of the notebook PC.

What is claimed is:

1. A battery pack for use in electronic equipment, comprising:
   a battery block;
   a charge/discharge circuit which provides a charge/discharge path for the battery block;
   a non-volatile memory readable and writable by the battery pack;
   a voltage measurement circuit which measures an output voltage of the battery block;
   a processor which stops a power supply through the charge/discharge circuit when the output voltage is less than an extinction voltage, resets and stops operating when the output voltage is at and below a reset voltage that is less than the extinction voltage, stores the output voltage measurement in the non-volatile memory on a regular cycle when the output voltage of the battery block is less than the extinction voltage and greater than the reset voltage, and permanently disables functions of the charge/discharge circuit after the processor resets if an amount of change in the output voltage measurement stored in the non-volatile memory per unit time exceeds a predetermined voltage change value.

2. The battery pack according to claim 1, wherein the processor and the non-volatile memory are formed integrally in a single semiconductor device.

3. The battery pack according to claim 1, wherein if the amount of change in the voltage per unit time exceeds a predetermined value and then the voltage of the battery block falls to a reset voltage value, the processor sets an inauthentic state in the non-volatile memory and permanently disables the functions of the charge/discharge circuit in a reset operation in response to the set inauthentic state.

4. The battery pack according to claim 1, wherein the processor permanently disables the functions of the charge/discharge circuit during a reset operation in response to the amount of change in the voltage per unit time.

5. The battery pack according to claim 1, wherein the processor's action of permanently disabling the functions of the charge/discharge circuit is selected from the group of the act of disabling functions of an overdischarge protection switch installed in the charge/discharge circuit, the act of disabling functions of an overcharge protection switch installed in the charge/discharge circuit, and the act of rewriting a control program executed by the processor.

6. The battery pack of claim 5, wherein the predetermined voltage change value is greater than 100 μV/hour per battery cell of the battery pack, the regular cycle is every 1,000 milliseconds, and the extinction voltage is 2.7 volts.

7. The battery pack according to claim 1,
the processor further setting a reset flag in the non-volatile memory if the amount of change in the output voltage measurement per unit time stored in the non-volatile memory does not exceed the predetermined voltage change value and permanently disables the functions of the charge/discharge circuit after resetting if the reset flag is not set.

8. A battery pack for use in electronic equipment, comprising:
a battery block;
a charge/discharge circuit which provides a charge/discharge path for the battery block;
a non-volatile memory readable and writable by the battery pack;
a voltage measurement circuit which measures an output voltage of the battery block;
a processor which stops a power supply through the charge/discharge circuit when the output voltage is less than an extinction voltage, resets and stops operating when the output voltage is at and below a reset voltage that is less than the extinction voltage, stores the output voltage measurement in the non-volatile memory on a regular cycle when the output voltage of the battery block is less than the extinction voltage and greater than the reset voltage, and permanently disables the charge/discharge circuit from discharging the battery block after the processor resets if an amount of change in the output voltage measurement stored in the non-volatile memory per unit time exceeds a predetermined voltage change value, wherein the processor sets an inauthentic state in the non-volatile memory if a discharge current value exceeds a predetermined current value, and the processor permanently disabled the functions of the charge/discharge circuit when resetting in response to the set inauthentic state.

9. The battery pack of claim 8, wherein the predetermined voltage change value is greater than 100 μV/hour per battery cell of the battery pack, the regular cycle is every 1,000 milliseconds, the extinction voltage is 2.7 volts, and the processor permanently disables the functions of the charge/discharge circuit by an action selected from disabling functions of an overdischarge protection switch installed in the charge/discharge circuit, disabling functions of an overcharge protection switch installed in the charge/discharge circuit, and rewriting a control program executed by the processor.

10. A method for disabling functions of a battery pack which has a battery block, a processor, and a non-volatile memory, comprising the steps of:
measuring an output voltage of the battery block on a regular cycle;
stopping a power supply through a charge/discharge circuit when the output voltage is less than an extinction voltage;
resetting and stopping operation of a processor when the output voltage is at and below a reset voltage that is less than the extinction voltage;
storing the output voltage measurement in a non-volatile memory on the regular cycle when the output voltage of the battery block is less than the extinction voltage and greater than the reset voltage;
permanently disabling, by use of the processor, functions of the battery pack after the processor resets if an amount of change in the output voltage measurement stored in the non-volatile memory per unit time exceeds a predetermined voltage change value.

11. The method for disabling functions of a battery pack according to claim 10, further comprising:
setting an inauthentic state in the non-volatile memory if the amount of change in the output voltage measurement stored in the non-volatile memory per unit of time exceeds the predetermined voltage change value and the functions of the battery pack are permanently disabled if the inauthentic state is set in the non-volatile memory.

12. The method of claim 10, wherein the predetermined voltage change value is greater than 100 μV/hour per battery cell of the battery pack, the regular cycle is every 1,000 milliseconds, and the extinction voltage is 2.7 volts, and the processor permanently disables the functions of the battery pack by an action selected from disabling functions of an overdischarge protection switch installed in the charge/discharge circuit, disabling functions of an overcharge protection switch installed in the charge/discharge circuit, and rewriting a control program executed by the processor.

13. A method for disabling functions of a battery pack which has a battery block, a processor, and a non-volatile memory, comprising the steps of:
measuring a discharge current and an output voltage of the battery block on a regular cycle; and
stopping the discharge current flowing through a charge/discharge circuit when the output voltage is less than an extinction voltage;
resetting and stopping operation of a processor when the output voltage is at and below a reset voltage that is less than the extinction voltage;
storing the discharge current measurement in a non-volatile memory on the regular cycle when the output voltage of the battery block is less than the extinction voltage and greater than the reset voltage;
permanently disabling, by use of the processor, functions of the battery pack after the processor resets if the discharge current measurement stored in the non-volatile memory.

14. The method for disabling functions of a battery pack according to claim 13, wherein the predetermined current value is larger than a discharge current value during self-discharging of the battery block.

15. The method of claim 13, wherein the predetermined current value is for an output voltage change of 100 μV/hour per battery cell of the battery pack, the regular cycle is every 1,000 milliseconds, and the extinction voltage is 2.7 volts, and the processor permanently disables the functions of the battery pack by an action selected from disabling functions of an overdischarge protection switch installed in the charge/discharge circuit, disabling functions of an overcharge protection switch installed in the charge/discharge circuit, and rewriting a control program executed by the processor.

* * * * *